US007797690B2

(12) United States Patent
Nesbitt et al.

(10) Patent No.: US 7,797,690 B2
(45) Date of Patent: Sep. 14, 2010

(54) SYSTEM, METHOD AND PROGRAM PRODUCT TO OPTIMIZE CODE DURING RUN TIME

(75) Inventors: Richard Elderkin Nesbitt, Holly Springe, NC (US); Brian Marshall O'Connell, Morrisville, NC (US); Kevin Edward Vaughan, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1556 days.

(21) Appl. No.: 11/081,054

(22) Filed: Mar. 15, 2005

(65) Prior Publication Data

US 2006/0212862 A1   Sep. 21, 2006

(51) Int. Cl.
    G06F 9/45       (2006.01)
(52) U.S. Cl. ........................................ 717/153; 717/154
(58) Field of Classification Search .................. 717/153
    See application file for complete search history.

(56) References Cited

U.S. PATENT DOCUMENTS

| 5,522,072 | A  | * | 5/1996 | De Bruler | 712/220 |
| 5,794,044 | A  |   | 8/1998 | Yellin | 395/704 |
| 5,907,711 | A  | * | 5/1999 | Benitez | 717/145 |
| 6,101,326 | A  | * | 8/2000 | Mattson, Jr. | 717/151 |
| 6,286,135 | B1 | * | 9/2001 | Santhanam | 717/146 |
| 6,363,522 | B1 | * | 3/2002 | Click et al. | 717/160 |
| 6,427,234 | B1 |   | 7/2002 | Chambers | 717/140 |
| 6,463,581 | B1 | * | 10/2002 | Bacon et al. | 717/154 |
| 6,588,009 | B1 | * | 7/2003 | Guffens et al. | 717/161 |
| 6,598,181 | B1 | * | 7/2003 | Pennell | 714/38 |
| 6,654,951 | B1 | * | 11/2003 | Bacon et al. | 717/154 |
| 6,728,952 | B1 |   | 4/2004 | Carey et al. | 717/141 |
| 6,851,106 | B1 | * | 2/2005 | Narisawa et al. | 717/108 |
| 7,028,293 | B2 | * | 4/2006 | Ruf | 717/152 |

(Continued)

FOREIGN PATENT DOCUMENTS

WO        WO 01/29662 A2    4/2001

(Continued)

OTHER PUBLICATIONS

Aho et al., "Compilers -Principles, Techniques and Tools". Addison Wesley Publishing Company. ISBN 0-201-10088-6., pp. 1-3.*

(Continued)

*Primary Examiner*—Tuan Q Dam
*Assistant Examiner*—Marina Lee
(74) *Attorney, Agent, or Firm*—Schmeiser, Olsen & Watts; Arthur J. Samodovitz

(57) ABSTRACT

System, process and program product for optimizing a computer program during run time. During run time, a determination is made whether the computer program calls a method which includes a conditional evaluation of a variable which is fixed and the evaluation of the fixed variable does not result in anything productive being accomplished except to return to execution of the computer program. If so, the call to the method which includes the conditional evaluation is deleted from the computer program for subsequent iterations of the computer program. Consequently, the subsequent execution of the computer program will yield a same result as if the conditional evaluation was executed. If the evaluation of the fixed variable results in something productive being accomplished, the call to the method which includes the conditional evaluation is not deleted from the subsequent execution of the computer program.

20 Claims, 2 Drawing Sheets

U.S. PATENT DOCUMENTS

| | | | |
|---|---|---|---|
| 7,086,044 B2* | 8/2006 | Hanson et al. | 717/151 |
| 7,100,156 B2* | 8/2006 | Archambault | 717/159 |
| 7,131,119 B2* | 10/2006 | Kumar | 717/160 |
| 7,222,337 B2* | 5/2007 | Click et al. | 717/160 |
| 7,318,223 B2* | 1/2008 | Blainey et al. | 717/160 |
| 7,363,621 B2* | 4/2008 | Takeuchi | 717/157 |
| 7,373,641 B2* | 5/2008 | Ogasawara | 717/151 |
| 7,376,941 B2* | 5/2008 | Allen | 717/157 |
| 2002/0095669 A1* | 7/2002 | Archambault | 717/157 |
| 2002/0174418 A1* | 11/2002 | Ruf | 717/155 |
| 2003/0079206 A1* | 4/2003 | Bates et al. | 717/129 |
| 2003/0149969 A1* | 8/2003 | Ogasawara | 717/158 |
| 2004/0015917 A1* | 1/2004 | Click et al. | 717/150 |
| 2004/0015925 A1* | 1/2004 | Hanson et al. | 717/155 |
| 2004/0019770 A1* | 1/2004 | Kawahito | 712/227 |
| 2004/0128660 A1* | 7/2004 | Nair et al. | 717/156 |
| 2004/0210882 A1* | 10/2004 | Takeuchi | 717/141 |
| 2005/0235265 A1* | 10/2005 | Allen | 717/126 |
| 2006/0130003 A1* | 6/2006 | Dasari et al. | 717/131 |

OTHER PUBLICATIONS

Aho et al., "Compilers -Principles, Techniques and Tools". Addison Wesley Publishing Company. ISBN 0-201-10088-6., pp. 1-149.*

Hover et al., "Tail-Call Optimization Constant Folding and Propagation, and Dead-Code Eliminatioin", Dec. 11, 2009, retrieved from <htttps://csel.cs.colorado.edu/~silkense/courses/csci4555/writeup.pdf>, total pp. 7.*

Auslander et al (SIGPLAN Notices, vo. 31, No. 5, pp. 149-159, May 1996).

Calder et al (Proceed of 13th Annual IEEE/ACM Int. Symp. On Microarchitecture, pp. 259-269, 1997).

* cited by examiner

SYSTEM, METHOD AND PROGRAM PRODUCT TO OPTIMIZE CODE DURING RUN TIME

BACKGROUND OF THE INVENTION

The invention relates generally to computer systems, and more specifically to a program tool to optimize program code for execution.

Computer programs often include conditional evaluations based on the value of a variable, such as "If X=A, then go to step 10000; otherwise go to step 10010. The condition can be true or false depending on the current value of the variable "X". For example, a variable "debug" is set to "true" when a program is in a debugging stage. There is a computer program which conditionally evaluates the variable "debug" to determine whether certain data, useful for debugging purposes, should be logged. In other words, the state of the debug variable is used in a decision step to determine whether to log the data. The decision step can be: "If debug=true, then write XYZ data to log; otherwise jump to next step". Thus, if the debug variable is set to "true", then the specified data is written to the log. However, if the program is not in the debug stage, for example, the program has already complete debugging, then there is no need to write the specified data to the log. So, after the debugging stage, the program developer uses a known program tool to set the variable "debug" to "false" so the XYZ data will not be written to the log. Also, the program developer will use this tool to declare that the "debug" variable is now fixed (or immutable) as "false". In Sun Microsystems Java (™) programming language and other runtime languages, this declaration will be entered by the programmer as a command written into the source code. The command means that once the variable is set for the first time to the desired fixed state during execution, it will never be changed. During compilation, the compiler records this declaration, monitors this variable, and returns an error code if the value of this variable is attempted to be changed from its initial value.

U.S. Pat. No. 6,728,952 discloses a computer system for identifying predicates that always are true or always are false (i.e. "vacuous"), and states that if the expression on which an IF statement depends is identified as a vacuous predicate, the code for the IF statement may be optimized. This is because the expression on which the IF statement depends will always be true or will always be false. This patent also states that specialized computer systems already exist which are able to determine whether a predicate is vacuous.

A publication entitled "Fast, Effective Dynamic Compilation", by Auslander et al., SIGPLAN Notices, vol. 31, no. 5, pages 149-159, May 1996, discloses various run time optimization techniques. For example, run-time constants can become instruction immediates rather than memory loads, constant propagation and folding can be applied to them, conditional branches based on them can be eliminated, and loops they control can be fully unrolled.

A publication entitled "Value Profiling" by Calder et al., Proceedings of 13th Annual IEEE/ACM International Symposium on Micro architecture, pages 259-269. 1997 discloses that identification of variables as invariant or constant at compile-time allows the compiler to perform optimizations including constant folding, code specialization and partial evaluation.

An object of the present invention is to further optimize execution of a program.

SUMMARY

The invention resides in a system, process and program product for optimizing a computer program during run time. During run time, a determination is made whether the computer program calls a method which includes a conditional evaluation of a variable which is fixed and the evaluation of the fixed variable does not result in anything productive being accomplished except to return to execution of the computer program. If so, the call to the method which includes the conditional evaluation is deleted from the computer program for subsequent iterations of the computer program. Consequently, the subsequent execution of the computer program will yield a same result as if the conditional evaluation was executed. If the evaluation of the fixed variable results in something productive being accomplished, the call to the method which includes the conditional evaluation is not deleted from the subsequent execution of the computer program.

According to features of the present invention, the call to the first said method is contained in a second method within the computer program, and the evaluation of the fixed variable results in a direct return to the second method. The conditional evaluation of the fixed variable does not result in a call to another method outside of the computer program, or any computations or other evaluations needed by the computer program. During a first iteration of the computer program, the value of the variable is set to the fixed value and an argument associated with the variable is computed.

DETAILED DESCRIPTION OF THE PREFERRED EMBODIMENT

The present invention will now be described in detail with reference to the figures.

Figure 1:
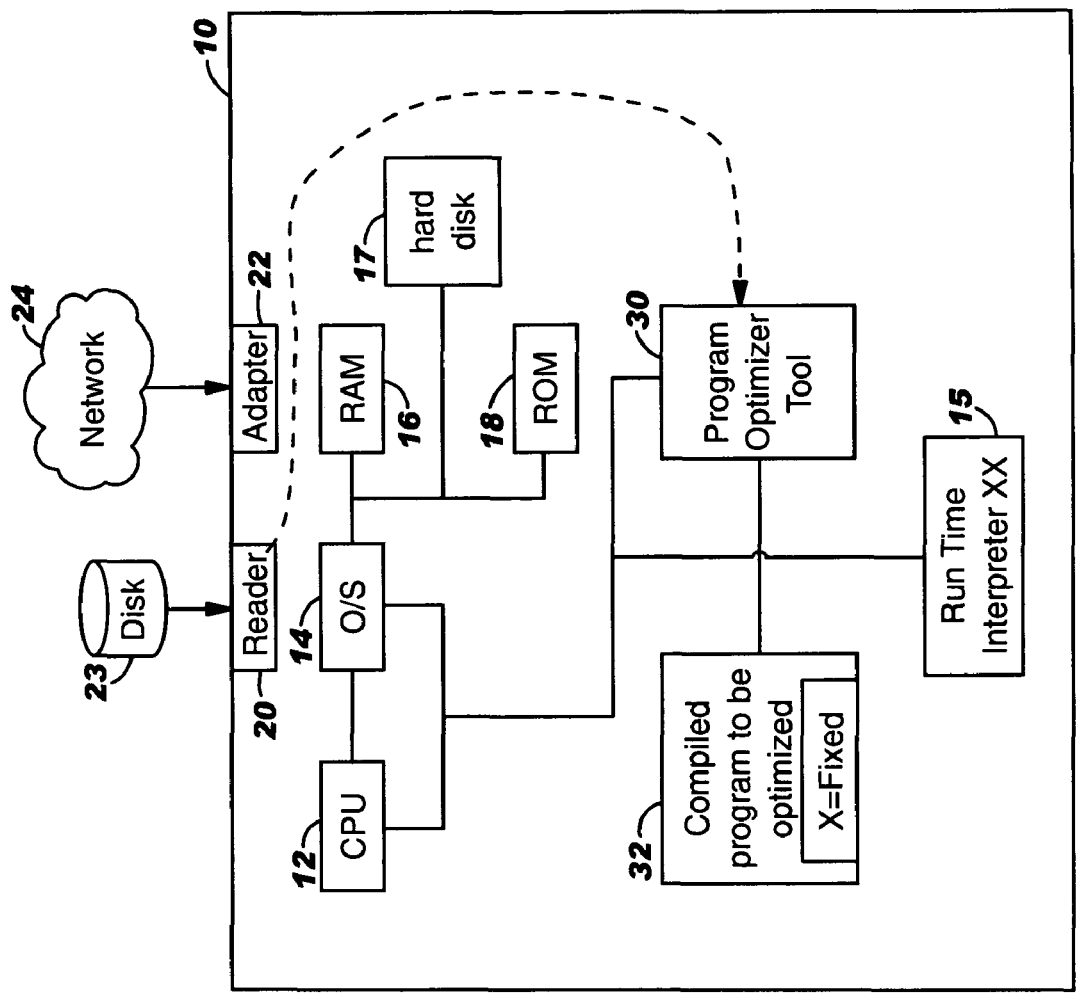
FIG. 1 is a block diagram of a computer in which the present invention is incorporated.

FIG. 1 illustrates a computer 10 in which the present invention is incorporated and executed. Computer 10 comprises a known CPU 12, operating system 14, run-time interpreter XX 15, RAM 16, hard disk 17, ROM 18, storage device reader 20 and network adapter card 22. Reader 20 can be a CD ROM reader, DVD reader, floppy disk reader or other reader of a storage medium 23 on which a computer program product embodying the present invention can be input to computer 10. Alternately, network adapter card 20 can read a computer program embodying the present invention from a computer readable network 24 such as the Internet or LAN. Network 24 also includes a propagation media to carry the computer program to computer 10 to be read into the computer 10. Once input to computer 10, computer program tool 30 embodying the present invention is stored in RAM 16 or hard disk 17 for execution on CPU 12. FIG. 1 also illustrates another computer program 32 to be executed by CPU 12 and optimized by computer program tool 30 in accordance with the present invention. The nature or function of computer program 32 is not important to the present invention, nor is the computer language in which computer program 32 was written. Computer program 32 has been compiled by a compiler (now shown) into a run time/object code format for execution in computer 10. By way of example, computer program 32 could have been written in Sun Microsystems JAVA (™) programming language.

Figure 2:
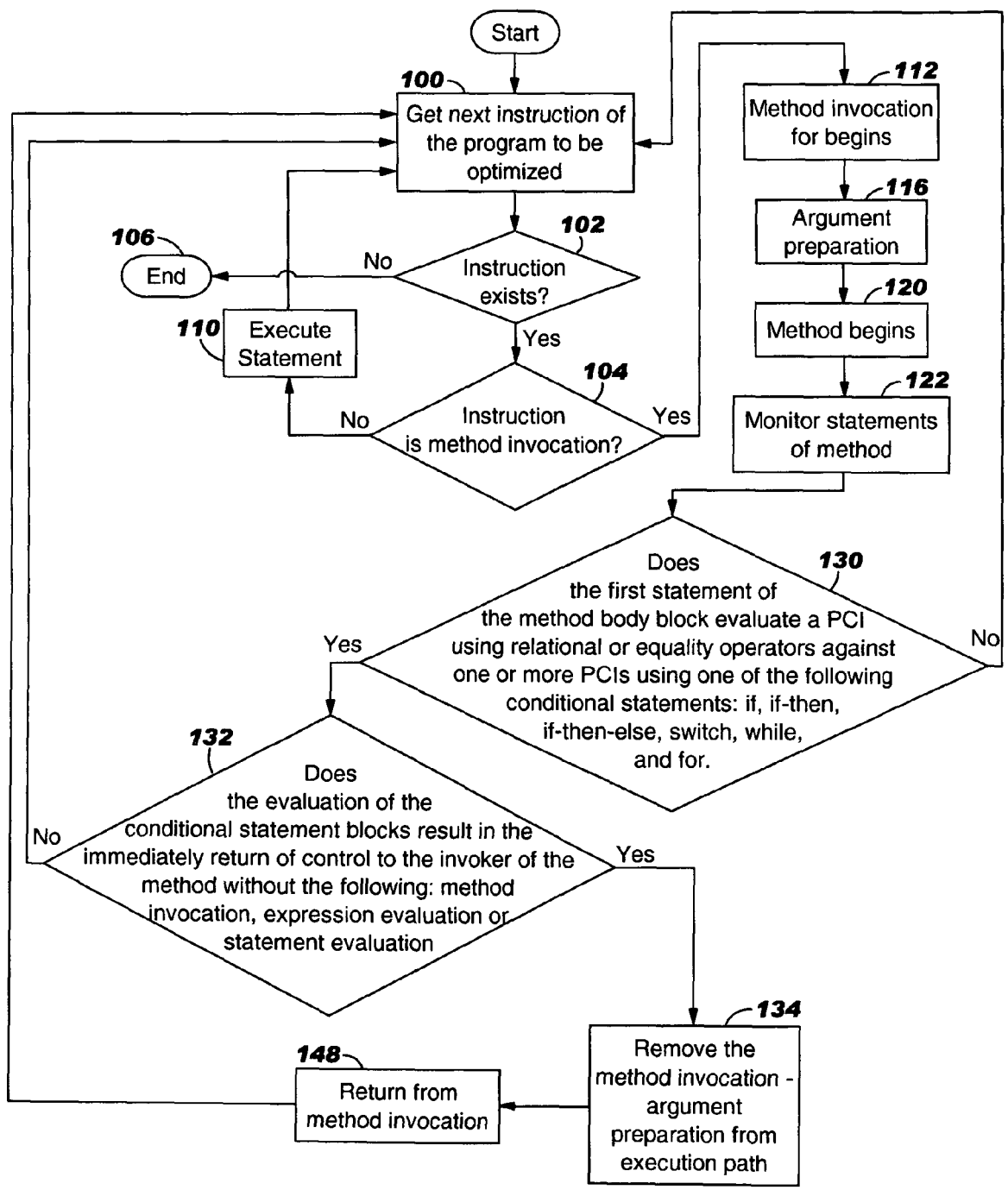
FIG. 2 is a flow chart of a computer program tool according to the present invention.

FIG. 2 illustrates processing performed by program tool 30 in accordance with the present invention. In step 100, program tool 30 fetches the "next" instruction of program 32 to be optimized and executed. During the first iteration of step 100, this should be the first instruction of program 32, and decision 102 leads to decision 104. (After the last instruction of program 32 is executed, then decision 102 will lead to step 106 which is the end of execution of program 32 and program tool 30.) After decision 102, yes branch, program tool 30 determines if this instruction of program 32 is a command to call/invoke a function such as a "method" (decision 104). A "method" is an object-oriented form of a function, such as to log data, calculate values, write to database, communicate over network or concatenate data strings. If the instruction is not a command to invoke a function (decision 104, no branch), then program tool 30 passes the instruction of program 32 to the run-time interpreter XX 15 for execution (step 110). However, if the instruction is a command to invoke a method (decision 104, yes branch), then program tool 30 invokes the method, i.e. calls it to begin execution (step 112). Then, the called method begins execution. This may involve the called method preparing any arguments that it will subsequently need for its own execution or a call to another method (step 116). By way of example, the arguments can comprise the identity of the user of program 32, calculation factor, data for database, network endpoint address or data strings. When there are such arguments, their preparation may involve computation, conjunction of character strings, fetches of data, etc. After preparing the arguments, the called function executes its operational instructions or statements such as to conditional evaluate variables, calculate results, write to database, connect to endpoint or concatenate data strings (step 120). As each instruction or statement of the called method is passed to the run-time interpreter XX 15 for execution, program tool 30 monitors the nature of program instruction or statement (step 122). During this monitoring, program tool 30 determines if the current program instruction or statement of the called method is to conditionally evaluate and act upon the value of a variable which was previously declared to be fixed (decision 130). All values being conditionally evaluated in this program step are fixed. These declarations would have occurred using another program tool when the program 32 was written in source code, and an indication that these variables were fixed would have been compiled into the object code of program 32. This is figuratively illustrated in FIG. 1 by the reference data in program 32 that the variable "X is fixed and A is C fixed". The following are examples of such conditional evaluations: "If X=A, then jump to step 10000; otherwise jump to step 10010 C", "If X=true and A=false, then jump to step 10000, otherwise jump to step 10010 C", "While X>A, then jump to step 10000; otherwise jump to step 10010 C". Thus, the determination of decision 130 is performed by looking for any conditional evaluation of these types. This determination is made based upon the modifier keywords in the source code for the variables which are compiled into the object code. A list of forms of such conditional evaluations is stored in memory. If none of the program instructions or statements of the called method (s) is to conditionally evaluate a fixed variable (decision 130, no branch), then program tool 30 loops back to step 100 to get and process the next program instruction or statement in program 32. However, if any of the program instructions or statements of the called method(s) is to conditionally evaluate a fixed variable (decision 130, yes branch), then program tool 30 determines if the conditional evaluation of the fixed variable always results in immediate/direct return to the invoker of the called method without anything productive resulting from the method, for example, without a call to another method, without a useful computation, without expression evaluation, and without statement evaluation (decision 132). Program tool 30 makes this determination by examining the resultant instruction of the aforementioned conditional evaluation to determine if it is a return to invoker. If something productive occurs (such as the resultant instruction is not a return), then program tool 30 proceeds to step 100 to fetch and process the next instruction or statement of program 32. However, if nothing productive results from the conditional evaluation of the fixed variable (except return to the caller) (decision 132, yes branch, then in step 134 program tool 30 would delete the call in the invoking method to the invoked (and thereby avoid execution of the conditional evaluation) and the program instructions in the invoking method needed to compute the argument for the call to the invoked method. The deletions in step 134 optimize subsequent execution of program 32 because there are now fewer instructions to process during the subsequent execution of program 32. Program 30 performs the actual instruction deletion by rewriting the object code. The run-time environment XX 15 contains facilities for modification (deletion) of the currently running object code. Each statement to be deleted is identified by program 30 in the steps described above. Next, program 30 returns from method invocation, i.e. sets the program counter equal to the program instruction resulting from the conditional evaluation (step 148). Then, program 30 proceeds to step 100 to fetch and process this instruction of program 32.

While the operation performed by the method which is called by program 32 or any method called by this method is not important to the present invention, the following is an example. In this example, program 32 defines a class C containing two functional methods. The following is the pseudo code for class C:

---
Pseudo code for Class C

ClassBody:
    ClassBodyDeclarations:
        FieldDeclaration:
            PCI Field X
        ConstructorDeclaration:
            SimpleTypeName:
                FormalParameterList:
                      Empty
            ConstructorBody:
                Assignment X = True
        MethodDeclaration:
            Method A
        MethodDeclaration:
            MethodB

---

The foregoing definition of Class C indicates in the first three lines of the body that variable "X" is fixed or Post Construction Immutable ("PCI"). The foregoing definition of Class C indicates in the middle six lines of the body that there are no parameters for the constructor for Class C, and the value of the variable "X" is "true". The foregoing definition of Class indicates in the last four lines of the body that Method A and Method B are contained within Class C.

In this example, the following is the pseudo code for Method A:

Pseudo code for Method A

```
Method A:
    MethodHeader:
        MethodModifiers(opt) ResultType MethodDeclarator
        Throws(opt)
            ResultType:
                Void
            MethodDeclarator:
                Formal ParameterList:
                    Empty
    MethodBody:
        Block:
            MethodInvocation (Method B)
                FormalParameterList:
                                    Expression:
                        String1+String2+String3
```

The foregoing definition of Method A indicates in the method header section that the method returns no value and accepts no arguments. The foregoing definition of Method A indicates in the method body section that the Method A contains a call to invoke Method B. The foregoing definition of Method A indicates in the method body section that the call to invoke Method B requires an argument formed by joining character strings (defining a user of program 32), i.e. joining String1+String2+String3. Before calling Method B, Method A joins the foregoing character strings prior to invoking Method B.

In this example, the following is the pseudo code for Method B:

Pseudo code for Method B

```
Method B:
    MethodHeader:
        MethodModifiers(opt) ResultType MethodDeclarator
        Throws(opt)
            ResultType:
                Void
            MethodDeclarator:
                Formal ParameterList:
                    String1
    MethodBody:
        Block:
            IfThenElseStatement:
                If (X not equal True)
                    Then:
                        Expression involving String1
                    Else:
                        Return
```

The foregoing definition of Method B indicates in the method header section that Method B returns no value and accepts one argument of type String labeled "String1". The foregoing definition of Method B indicates in the method body section that Method B performs a conditional evaluation of variable "X", i.e. "If X is not equal to True, then perform operation involving String1. If X is equal to True then immediately/directly return to the invoker" (without anything productive happening, for example, without invoking another method, without performing a useful computation, without expression evaluation and without statement evaluation).

During execution of program 32 the run-time interpreter XX produces a new instance of Class C. During creation of this instance of Class C, the run-time interpreter XX records that the variable "X" is fixed (as noted by the compiler), and supplies program 32 with the addressing information for Method A. When program 32 is subsequently invoked and executes, it invokes Method A which begins to execute in step 112. In response, Method A initially computes the argument for calling Method B, by joining String1+String2+String3 in step 116. After computing the argument, Method A invokes Method B in step 120. While Method A and Method B are being executed, program 30 monitors the instruction statements of Method A and Method B in step 122. During this monitoring, program 30 notices that in Method B, a variable "X" is fixed and is being compared to another fixed variable or a fixed value, and the result is an immediate/direct return to the invoker, Method A, with nothing productive occurring (decision 130, yes branch). Consequently, program 30 optimizes program 32 by removing from Method A in program 32 the call to Method B and the associated instructions for computing the argument for the call to Method B. After program 30 optimizes Method A, the following steps enclosed in brackets [ ] are removed from Method A in step 134:

Optimized Pseudo code for Method A

```
Method A:
    MethodHeader:
        MethodModifiers(opt) ResultType MethodDeclarator
        Throws(opt)
            ResultType:
                Void
            MethodDeclarator:
                Formal ParameterList:
                    Empty
    MethodBody:
        Block:
            [MethodInvocation (Method B)]
                [FormalParameterList:]
                    [X]
                    [Expression:]
                        [String1+String2+String3]
```

Thus, during the next iteration of program 32 the foregoing steps enclosed in brackets [ ] are not executed when program 32 calls Method A. This reduces the processing time of program 32.

Based on the foregoing, a system, method and program product to optimize a computer program during run time have been disclosed. However, numerous modifications and substitutions can be made without deviating from the scope of the present invention. Therefore, the present invention has been disclosed by way of illustration and not limitation, and reference should be made to the following claims to determine the scope of the present invention.

The invention claimed is:

1. A process for optimizing a computer program during run time, said computer program including a call to a first method, said first method including a call to a second method, said process comprising the steps of:

during run time, a processor of a computer determining if said second method includes a conditional evaluation of a variable which is fixed such that the execution of said second method does not result in anything productive being accomplished except to return to said first method, and if so, deleting in said first method said call to said second method, and if not, not deleting said call in said first method to said second method.

2. A process as set forth in claim 1 wherein said first method also includes instructions to compute an argument required for said call to said second method, and said second method includes a conditional evaluation of a variable which is fixed such that execution of said second method does not result in anything productive being accomplished except to return to said first method, and further comprising the step of deleting from said first method said instructions to compute said argument required for said call to said second method.

3. A process for optimizing a computer program during run time of the computer program, said process comprising executing a program tool on a processor of a computer during said run time of the computer program, said program tool stored in a memory of the computer, said computer program being object code configured to be executed on the processor, said object code having been previously compiled by a compiler from source code, said computer program comprising a sequence of program statements declared explicitly in the source code to be a method, said executing the program tool during said run time comprising:

fetching an instruction of the computer program;

said processor determining that the fetched instruction consists of a call to the method, said fetched instruction being comprised by program code of the computer program;

responsive to said determining that the fetched instruction consists of said call to the method, said processor determining that a program statement of the declared sequence of program statements of the method includes a conditional evaluation of a fixed variable, wherein a declaration statement appearing in the source code explicitly declares the fixed variable as having a fixed value, and wherein an assignment statement appearing in the source code assigns the fixed value to the fixed variable, and wherein the declaration statement and the assignment statement are different statements in the source code;

responsive to said determining that said program statement includes said conditional evaluation, said processor determining that an immediate return condition exits in the method such that an evaluation of the fixed variable results in an immediate return from the method to the program code without performance of any other program statement of the method; and responsive to said determining that the immediate return condition exits, deleting from the computer program the fetched instruction that consists of the call to the method.

4. The process of claim 3, wherein the program code comprises program code instructions that compute at least one argument for said call to the method in the fetched instruction, and wherein said executing the program tool during said run time further comprises deleting the program code instructions comprised by the program code in response to said determining that the immediate return condition exits.

5. The process of claim 4, wherein the program tool performs both said deleting the call to the method and said deleting the program code instructions by rewriting the object code.

6. The process of claim 4, wherein said executing the program tool during said run time further comprises after said deleting the fetched instruction from the computer program and after said deleting the program code instructions comprised by the program code, performing a loop for processing multiple instructions of the computer program, said performing the loop consisting of:

ascertaining whether a next instruction of the multiple instructions exists;

responsive to said ascertaining, exiting the loop to terminate said processing multiple instructions if said ascertaining ascertains that said next instruction does not exist or getting the next instruction if said ascertaining ascertains that said next instruction exists;

responsive to said ascertaining that said next instruction exists, determining whether said next instruction consists of calling the method;

responsive to determining that said next instruction does not consist of said calling the method, executing said next instruction followed by looping back to said ascertaining; and responsive to determining that said next instruction consists of said calling the method, processing the next instruction, wherein said processing the next instruction comprises:

determining whether the method includes a conditional evaluation of a constant variable;

responsive to determining that the method does not include said conditional evaluation of a constant variable, looping back to said ascertaining;

responsive to determining that the method includes said conditional evaluation of a constant variable, determining whether an evaluation of the constant variable would result in immediately returning from the method;

responsive to determining that said evaluation of the constant variable would not result in said immediately returning from the method, performing said looping back to said ascertaining; and responsive to determining that said evaluation of the constant variable would result in said immediately returning from the method, deleting said calling the method followed by performing said looping back to said ascertaining.

7. The process of claim 3, wherein said executing the program tool during said run time comprises monitoring the program statements of the sequence of program statements while passing the object code to a run-time interpreter, wherein the process comprises said run-time interpreter executing the object code during said run time, and wherein said executing the program tool during said run comprises said deleting the fetched instruction from the computer program.

8. The process of claim 3, wherein the method called by the fetched instruction is a second method that is called by a first method, wherein the computer program comprises a set of programming instructions declared explicitly in the source code to be the first method, and wherein the set of programming instructions comprises the program code that comprises the fetched instruction.

9. A computer program product for optimizing a computer program during run time of the computer program, said computer program product comprising computer readable storage media and multiple program instructions to execute a program tool on a processor of a computer during said run time of the computer program, said program tool stored in a memory of the computer, said computer program being object code configured to be executed on the processor, said object code having been previously compiled by a compiler from source code, said computer program comprising a sequence of program statements declared explicitly in the source code to be a method, said multiple program instructions stored on the computer readable storage media, said multiple program instructions comprising:

first program instructions to fetch an instruction of the computer program;

second program instructions to determine that the fetched instruction consists of a call to the method, said fetched instruction being comprised by program code of the computer program;

third program instructions to determine, in response to prior execution of the second program instructions, that a program statement of the declared sequence of program statements of the method includes a conditional evaluation of a fixed variable, wherein a declaration statement appearing in the source code explicitly declares the fixed variable as having a fixed value, and wherein an assignment statement appearing in the source code assigns the fixed value to the fixed variable, and wherein the declaration statement and the assignment statement are different statements in the source code;

fourth program instructions to determine, in response to prior execution of the third program instructions, that an immediate return condition exits in the method such that an evaluation of the fixed variable results in an immediate return from the method to the program code without performance of any other program statement of the method; and fifth program instructions to delete from the computer program, in response to prior execution of the fourth program instructions, the fetched instruction that consists of the call to the method.

10. The computer program product of claim 9, wherein the program code comprises program code instructions to compute at least one argument for said call to the method in the fetched instruction, and wherein to execute the program tool during said run time comprises to delete the program code instructions comprised by the program code in response to a determination having been made that the immediate return condition exits.

11. The computer program product of claim 10, wherein the program tool includes program tool instructions to delete the call to the method and to delete the program code instructions by rewriting the object code.

12. The computer program product of claim 10, wherein the multiple program instructions further comprises program instructions to perform a loop, after the fetched instruction has been deleted from the computer program and after the program code instructions comprised by the program code have been deleted, to process multiple instructions of the computer program, wherein the program instructions to perform the loop consist of instructions to perform the steps of:

ascertaining whether a next instruction of the multiple instructions exists;

responsive to said ascertaining, exiting the loop to terminate said processing multiple instructions if said ascertaining ascertains that said next instruction does not exist or getting the next instruction if said ascertaining ascertains that said next instruction exists;

responsive to said ascertaining that said next instruction exists, determining whether said next instruction consists of calling the method;

responsive to determining that said next instruction does not consist of said calling the method, executing said next instruction followed by looping back to said ascertaining; and responsive to determining that said next instruction consists of said calling the method, processing the next instruction, wherein said processing the next instruction comprises:

determining whether the method includes a conditional evaluation of a constant variable;

responsive to determining that the method does not include said conditional evaluation of a constant variable, looping back to said ascertaining;

responsive to determining that the method includes said conditional evaluation of a constant variable, determining whether an evaluation of the constant variable would result in immediately returning from the method;

responsive to determining that said evaluation of the constant variable would not result in said immediately returning from the method, performing said looping back to said ascertaining; and responsive to determining that said evaluation of the constant variable would result in said immediately returning from the method, deleting said calling the method followed by performing said looping back to said ascertaining.

13. The computer program product of claim 9, wherein to execute the program tool during said run time comprises to monitor the program statements of the sequence of program statements while passing the object code to a run-time interpreter, wherein the computer program product comprises said nm-time interpreter configured to execute the object code during said run time, and wherein to execute the program tool during said run comprises to delete the fetched instruction from the computer program.

14. The computer program product of claim 9, wherein the method is a second method, wherein the call to the second method is in a first method, wherein the computer program comprises a set of programming instructions declared explicitly in the source code to be the first method, and wherein the set of programming instructions comprises the program code that comprises the fetched instruction.

15. A system for optimizing a computer program during run time of the computer program, said system comprising a processor of a computer, a computer readable memory, computer readable storage media, and multiple program instructions to execute a program tool on the processor during said run time of the computer program, said program tool stored in the computer readable memory, said computer program being object code configured to be executed on the processor, said object code having been previously compiled by a compiler from source code, said computer program comprising a sequence of program statements declared explicitly in the source code to be a method, said multiple program instructions stored on the computer readable storage media for execution by the processor, said multiple program instructions comprising:

first program instructions to fetch an instruction of the computer program;

second program instructions to determine that the fetched instruction consists of a call to the method, said fetched instruction being comprised by program code of the computer program;

third program instructions to determine, in response to prior execution of the second program instructions, that a program statement of the declared sequence of program statements of the method includes a conditional evaluation of a fixed variable, wherein a declaration statement appearing in the source code explicitly declares the fixed variable as having a fixed value, and wherein an assignment statement appearing in the source code assigns the fixed value to the fixed variable, and wherein the declaration statement and the assignment statement are different statements in the source code;

fourth program instructions to determine, in response to prior execution of the third program instructions, that an immediate return condition exits in the method such that an evaluation of the fixed variable results in an immediate return from the method to the program code without performance of any other program statement of the method; and fifth program instructions to delete from the computer program, in response to prior execution of the fourth program instructions, the fetched instruction that consists of the call to the method.

16. The system of claim 15, wherein the program code comprises program code instructions to compute at least one argument for said call to the method in the fetched instruction, and wherein to execute the program tool during said run time comprises to delete the program code instructions comprised by the program code in response to a determination having been made that the immediate return condition exits.

17. The system of claim 16, wherein the program tool includes program tool instructions to delete the call to the method and to delete the program code instructions by rewriting the object code.

18. The system of claim 16, wherein the multiple program instructions further comprises program instructions to perform a loop, after the fetched instruction has been deleted from the computer program and after the program code instructions comprised by the program code have been deleted, to process multiple instructions of the computer program, wherein the program instructions to perform the loop consist of instructions to perform the steps of:

ascertaining whether a next instruction of the multiple instructions exists;

responsive to said ascertaining, exiting the loop to terminate said processing multiple instructions if said ascertaining ascertains that said next instruction does not exist or getting the next instruction if said ascertaining ascertains that said next instruction exists;

responsive to said ascertaining that said next instruction exists, determining whether said next instruction consists of calling the method;

responsive to determining that said next instruction does not consist of said calling the method, executing said next instruction followed by looping back to said ascertaining; and responsive to determining that said next instruction consists of said calling the method, processing the next instruction, wherein said processing the next instruction comprises:

determining whether the method includes a conditional evaluation of a constant variable;

responsive to determining that the method does not include said conditional evaluation of a constant variable, looping back to said ascertaining;

responsive to determining that the method includes said conditional evaluation of a constant variable, determining whether an evaluation of the constant variable would result in immediately returning from the method;

responsive to determining that said evaluation of the constant variable would not result in said immediately returning from the method, performing said looping back to said ascertaining; and responsive to determining that said evaluation of the constant variable would result in said immediately returning from the method, deleting said calling the method followed by performing said looping back to said ascertaining.

19. The system of claim 15, wherein to execute the program tool during said run time comprises to monitor the program statements of the sequence of program statements while passing the object code to a run-time interpreter, wherein the system comprises said run-time interpreter configured to execute the object code during said run time, and wherein to execute the program tool during said run comprises to delete the fetched instruction from the computer program.

20. The system of claim 15, wherein the method is a second method, wherein the call to the second method is in a first method, wherein the computer program comprises a set of programming instructions declared explicitly in the source code to be the first method, and wherein the set of programming instructions comprises the program code that comprises the fetched instruction.

* * * * *